United States Patent
Eyal

(10) Patent No.: US 6,519,648 B1
(45) Date of Patent: Feb. 11, 2003

(54) STREAMING MEDIA SEARCH AND CONTINUOUS PLAYBACK OF MULTIPLE MEDIA RESOURCES LOCATED ON A NETWORK

(75) Inventor: Aviv Eyal, San Francisco, CA (US)

(73) Assignee: Friskit, Inc., San Francisco, CA (US)

( * ) Notice: Subject to any disclaimer, the term of this patent is extended or adjusted under 35 U.S.C. 154(b) by 0 days.

(21) Appl. No.: 09/613,433

(22) Filed: Jul. 11, 2000

Related U.S. Application Data

(63) Continuation-in-part of application No. 09/563,250, filed on May 2, 2000, now Pat. No. 6,389,467.
(60) Provisional application No. 60/177,786, filed on Jan. 24, 2000.

(51) Int. Cl.[7] .................... G06F 15/16; G06F 15/173
(52) U.S. Cl. .................... 709/231; 709/245; 709/223
(58) Field of Search ................ 709/231, 245; 707/223, 10; 345/327

(56) References Cited

U.S. PATENT DOCUMENTS

| | | |
|---|---|---|
| 5,297,042 A | 3/1994 | Morita |
| 5,442,390 A * | 8/1995 | Hooper et al. ............ 348/7 |
| 5,548,724 A | 8/1996 | Akizawa et al. .......... 709/105 |
| 5,583,868 A | 12/1996 | Rashid et al. ............ 370/394 |
| 5,659,732 A | 8/1997 | Kirsch .................... 395/605 |
| 5,668,948 A | 9/1997 | Balknap et al. ........... 348/552 |
| 5,778,367 A * | 7/1998 | Wesinger, Jr. et al. ..... 707/10 |
| 5,864,863 A | 1/1999 | Burrows ................... 707/103 |
| 5,873,080 A | 2/1999 | Coden et al. .............. 707/3 |
| 5,890,152 A | 3/1999 | Rapaport et al. |
| 5,892,905 A | 4/1999 | Brandt et al. ............. 709/202 |
| 5,911,139 A | 6/1999 | Jain et al. ................ 707/3 |
| 5,915,094 A * | 6/1999 | Kouloheris et al. ........ 345/327 |
| 5,920,856 A | 7/1999 | Syeda-Mahmood .......... 707/3 |
| 5,961,603 A | 10/1999 | Kunkel et al. ............ 709/225 |
| 5,983,176 A | 11/1999 | Hoffert et al. |
| 5,987,454 A | 11/1999 | Hobbs ..................... 707/4 |
| 5,996,015 A | 11/1999 | Day et al. ................ 709/219 |
| 6,009,459 A | 12/1999 | Belfiore et al. .......... 707/10 |
| 6,011,537 A | 1/2000 | Slotznick |
| 6,016,504 A | 1/2000 | Arnold et al. |
| 6,021,409 A | 2/2000 | Burrows .................. 707/102 |
| 6,035,055 A | 3/2000 | Wang et al. .............. 382/118 |
| 6,041,360 A * | 3/2000 | Himmel et al. ........... 709/245 |
| 6,049,829 A | 4/2000 | Li ......................... 709/229 |
| 6,058,423 A | 5/2000 | Factor ................... 709/104 |
| 6,075,787 A | 6/2000 | Bobeck et al. |
| 6,134,596 A | 10/2000 | Bolosky et al. .......... 709/213 |
| 6,134,680 A | 10/2000 | Yeomans |
| 6,151,624 A | 11/2000 | Teare et al. ............. 707/5 |
| 6,192,340 B1 | 2/2001 | Abecassis ................ 704/270 |
| 6,202,061 B1 | 3/2001 | Khosla et al. ............ 707/3 |
| 6,216,112 B1 | 4/2001 | Fuller et al. |
| 6,240,423 B1 | 5/2001 | Hirata ................... 707/104 |
| 6,247,069 B1 * | 6/2001 | Smyers .................... 710/8 |
| 6,271,840 B1 | 8/2001 | Finseth et al. |
| 6,317,740 B1 | 11/2001 | Mukherjea et al. ........ 707/4 |

OTHER PUBLICATIONS

"Lycos MP3 Web Search Engine", http://www.music.lycos.com, 2 pages.
"Fast Multimedia Search Engine", http://www.multimedia.alltheweb.com, 1 page.
"A Web Jukebox, Creating a Custom Multimedia Player for Your Site", by Aviv Eyal. (Electronic publication).

* cited by examiner

Primary Examiner—Krisna Lim
(74) Attorney, Agent, or Firm—Van Mahamedi; Hickman Palermo; Truong & Becker LLP

(57) ABSTRACT

A playback system is provided to locate and playback streaming media from network resources. The playback system includes a search module that signals a query to a network site, and receives in return a search result. The search result identifies one or more links that are selectable to open media files. A media player couples to the search module to automatically play back streaming media contained in media files located by the search result.

63 Claims, 7 Drawing Sheets

STREAMING MEDIA SEARCH AND CONTINUOUS PLAYBACK OF MULTIPLE MEDIA RESOURCES LOCATED ON A NETWORK

CROSS RELATED APPLICATIONS

This application is a continuation-in-part of U.S. patent application Ser. No. 09/563,250, entitled "STREAMING MEDIA SEARCH AND CONTINUOUS PLAYBACK SYSTEM OF MEDIA RESOURCES LOCATED BY MULTIPLE NETWORK ADDRESSES", naming A. Eyal as the sole inventor, and filed on May 2, 2000, the aforementioned priority application being hereby incorporated by reference; and this application claims benefit to priority to Provisional Patent Application Ser. No. 60/177,786, filed Jan. 24, 2000, entitled "STREAMING MEDIA SEARCH AND PLAYBACK SYSTEM", naming A. Eyal and G. Asporopos as inventors.

BACKGROUND OF THE INVENTION

1. Field of the Invention

This invention relates to the field of streaming media content search and playback over a network. In particular, the invention relates to a computer system that enables a continuous streaming media playback from a distribution of sites available over a network such as the Internet.

2. Description of the Related Art

Computers currently can access streaming media on the Internet. Streaming media available on the Internet include, for example, music, video clips such as movie trailers, home movies, and animation.

Users locate streaming media on the Internet by manually selecting links. Typically, users browse the media sites that contain numerous sub-links. Users sometimes select through a chain of links to locate a desired media on a media link. Once located, the desired media link may or may not contain the desired media.

Some services provide media search engine capabilities. Users may enter a search request for selected media creations by an artist. The media search engine then displays links to categories and/or sub-links of media that are determined to match one or more criteria in the search request set forth by the user. The determination of which links should be displayed in response to the search request is dependent on the algorithm used in by the search engine. Typically, links displayed to users of current search engines are not subject to a determination of the quality or availability of the media associated with the media links. Further, the search results are outputted to the user as a display of links for the user's selection.

Many Internet streaming media outlets provide a limited number of source nodes. The sites can be unreliable when the number of users accessing the site become congested.

SUMMARY OF THE INVENTION

Embodiments of the invention provide a media playback system for playing back streaming media from a network. The media playback system communicates with third party search engines to locate streaming media according to a request generated on a client terminal. The request is converted into a query that is signaled to the search engines. The search results to the query are received by the media playback system and parsed for media links to streaming media. The media links are signaled to a media player for playback on the client terminal. In an embodiment, the media player is able to continuously and automatically play back streaming media on the terminal using media links signaled from the search engines.

DETAILED DESCRIPTION

A. System Overview

Figure 1:
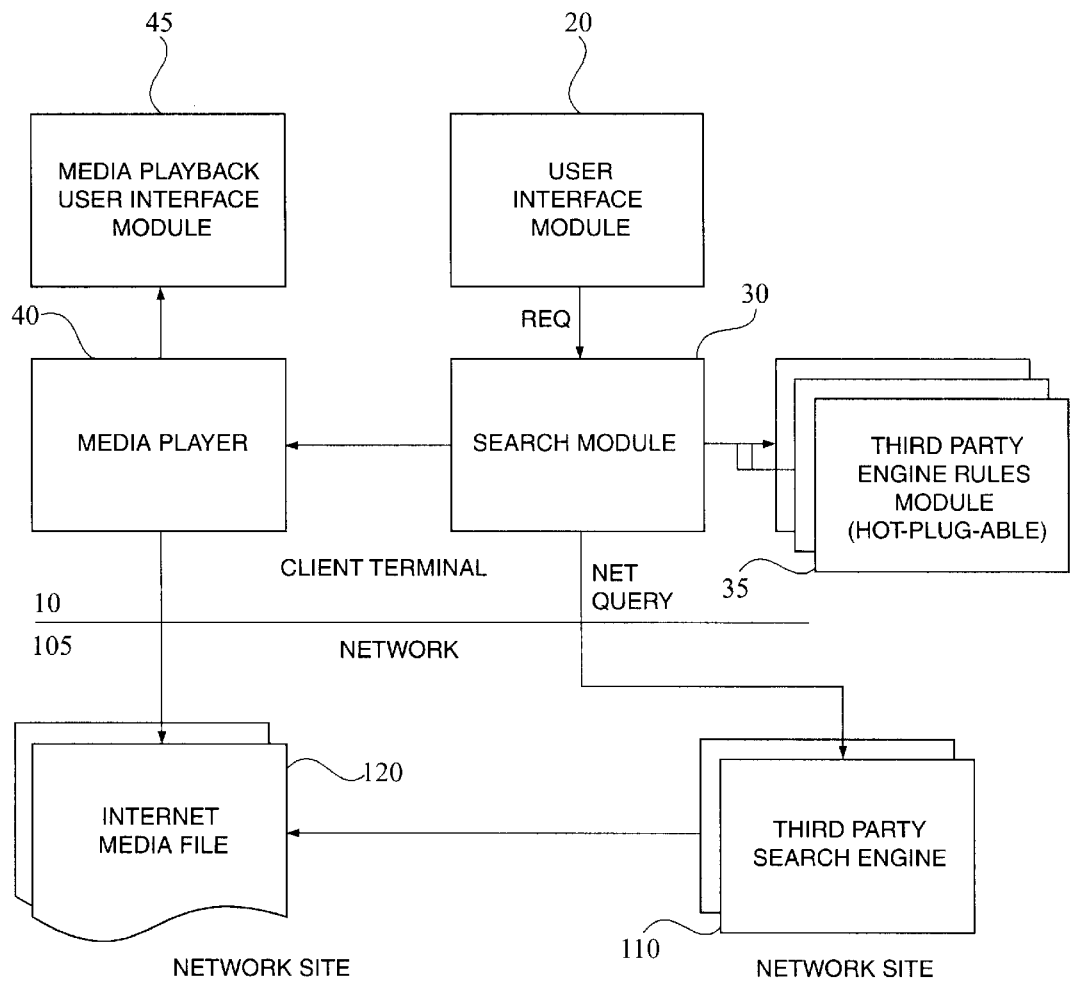
FIG. 1 illustrates an architecture for a media playback system employed on a terminal, under an embodiment of the invention.

Embodiments of the invention provide a system for playing back media from a network on a terminal. An embodiment includes a search module that submits queries to network sites, and preferably to network search engines. The network sites returns a search result comprising links that are selectable to open associated media files. The media files preferably match a term or criteria of the query. The search module identifies one or more of the links contained in the search result. The identified links are signaled to a media player. The media player automatically play back streaming media contained in the media files associated with the identified links of the search result.

Embodiments of the invention may be implemented on the Internet. Other embodiments may be implemented on any network that carries digital information, such as local-area networks (LANs), Wide Area Networks (WAN), Extranets, Intranets, Internet, and wireless networks, or networks utilizing wireless transmissions. An example of a network for use with an embodiment of the invention includes a network operating under a transmission control protocol/Internet protocol (TCP/IP). Embodiments of the invention may also be employed on proprietary WANs, such as America Online™. Thus, discussion of embodiments employed on the Internet are exemplary, and equally applicable to other types of networks described above.

The client terminal for use with embodiments of the invention include a network enabled device coupleable to a network such as the Internet. In an embodiment, the client terminal may include a communication port, a processor, a memory, and a display. The communication port may be a physical port, such as a connector extending a modem connection. The communication port may also be a wireless port, such as those configured to transmit and receive radio frequency data communications. Examples of client terminals include personal computers, handheld devices such as those operating Windows CE™ or Palm™ operating systems, and cellular phones with Internet capabilities such as Sprint PCS™ systems. Other examples of network enabled devices include smart appliances, such as systems including speakers and a processor to receive communications from the network.

As used herein, a module includes a program, a subroutine, a portion of a program, a software component or a hardware component capable of performing a stated task or function. A module can exist on a hardware component such as a server independently of other modules, or a module can exist with other modules on the same server or client terminal, or within the same program.

In one embodiment, the system is provided on a client terminal coupled to the Internet. The network sites correspond to third-party Internet search engines that can locate links to media files. Examples of such search engines include Yahoo®, Lycos®, as well as search engines available at www.streambox.com, and www.gigabeat.com. Embodiments of the invention may also be used with a database for storing media links, such as described with U.S. Pat. App. Ser. No 09/563,250 (incorporated by reference herein). The network sites may also correspond to media directories, which store network addresses that locate media files.

Under one embodiment, the playback system on the terminal includes a user-interface to prompt users for queries. The user-queries may be entered as search terms. The search module converts the search terms of the user-query into a format for one or more search engines. The formatted queries may be in the form of uniform resource locators (URLs). The search engine signals a URL corresponding to search terms of the user-query to a search engine on the network. In response to submitting the query to the search engine, the search module receives a search-page. For the Internet, the search-page is a web-page, such as a page written in the hyper-text markup language (HTML). The search module may parse the search page for links to media files. The links identified by the search module are selectable to open a corresponding media file. The search module identifies the links on the search page and signals the links to a media player. In this way, a program formed by streaming media from a plurality of media links can be continuously played back to a user of the terminal.

The system may be used in conjunction with finding streaming media corresponding to audio recordings on a network such as the Internet. For example, the search terms may relate to music, and include artist name, song title, music genre (classical, jazz and rock), and file data type (MPEG, WAV) Alternatively, the system may be used in conjunction with finding streaming media corresponding to video recordings, or a combination of video and audio recordings.

In an embodiment, the search module submits the user-query to a plurality of third party search engines. The search module includes logic to convert the user-query to an individual network query directed to one or more of the search engines. Each network query may be in the form of a URL, including a network address for the respective network search engine, as well as arguments based on logic specific to that network search engine. The system then receives a plurality of search results from each of the network search engines. A parsing component identifies a plurality of links from the search results, where the plurality of links are each selectable to open a media file located by the search engine. The links identified by the parsing component are then signaled to a media player. The media player loads and accesses media files using the links identified from the search results. In this way, the media player continuously plays back streaming media from the different links contained in the search results.

The media player includes an application that plays back streaming media files. Examples of commercially available media players include Real Network Player™, Apple Quick-Time Player™, and Microsoft Windows Media Player™.

In one implementation, the media files may be loaded on the client terminal to play back and output music, or music videos. However, media files may include any form of media accessible over a network as streaming data. Media may also include, for example, video or animation with story-lines, plots, characters and resemble conventional television or radio programming. Other examples include movie clips, home movies, movie trailers, or highlights from sporting events.

In another embodiment, the links identified from the search results are arranged into a designated order by a playlist module coupled to the search module. The links are arranged before being signaled to the media player. The designated order may be determined by the order of priority designated by the third-party search engines. The designated order may alternatively be provided by logic included with the media playback system. For example, the media links may be arranged in an order for playback based on a quality of the associated media files, or a duration of the media playback from the media links, or by other user-defined criterias. The media player then sequentially and continuously plays back streaming media from the search results according to the designated order.

Under one embodiment, the media playback system plays back media based on the user-query inputted by the user of the terminal. The media playback system may operate in the background of the terminal, while the user browses websites or operates applications on the terminal.

Still further, in another embodiment, the user-query may be based on user-input or functions other than entering search terms. The user-query may be a signal associated with the user opening an application. For example, the user may designate to hear classical music when opening a word processor. When the user opens the word processor, the user-query is submitted automatically in the background for classical music. Alternatively, the user-query may be a collection of favorite media clips preferred by the user of the terminal. The system may collect information on the user's preferences, and then locate media clips according to the preferences of the user. In another example, when the terminal is signaled into a screen-saver or idle mode, the media playback system may be configured to play classical music.

Among other advantages of the invention, the user terminal accesses media files at various sites on a network, without requiring users to manually select media links. For example, user-terminals may output music to a user by automatically accessing one or more Internet sites containing media files. The music is outputted without requiring users' to view and select links to sites containing the media.

Further, embodiments of the invention may be implemented as client-side modules that interact with third-party search engines. Thus, client-side modules can be operated independent of server-side controls in searching and playing back streaming media.

In contrast to embodiments of the invention, using other systems to search for Internet files containing media can be a distracting and time-consuming experience for an end user. In many instances, such a search will yield a series of links on a directory or web search page. A user may have to click on each individual link, one at a time, to play each individual media file. The selected media file may be broken and unavailable to deliver media content. Even if the number of broken links is not high, the user must still click on the links one at a time to activate each media file, providing at best a stop-and-go experience.

In one embodiment of the invention, a user terminal is able to receive continuous media streaming from multiple sites on the Internet. Multiple sites may be accessible to enable the user terminal to receive streaming media without any interaction required from an end user other than signaling a request to receive streaming media. The user terminal automatically accesses media links containing media using a media player.

Further, streaming media may be continuously outputted from multiple Internet sites on client terminals. The streaming media may be located and outputted based on predetermined and personalized criterias. The criteria may be set forth by information entered by a user of the client terminal, or by actions performed by the user.

Another advantage of the invention is that a client terminal may be configured to continuously and automatically output streaming media from multiple Internet sites by accessing third party search engines using only client-side applications. The use of multiple network search engines in conjunction with client-side applications minimizes the effects of one Internet site or search engine being unavailable on the network. Further, the configuration enables terminals to be operated as network radios or jukeboxes, providing streaming media continuously, at the selection of the user, with no user-interaction required.

Another embodiment of the invention includes a recommendation module that suggests or submits search requests for the user of the client terminal. The recommended search requests can be used to access the user to new types of streaming media, such as for example, different categories of music or artists that are unknown to the user.

Still further, an embodiment of the invention employs multiple search engines to ensure media playback to the user that is high in quality and relevance. This is because the media playback system is able to combine the best and most relevant search results from different search engines for media playback.

B. System Architecture and Components

FIG. 1 details software components of a media playback system, under an embodiment of the invention. The media playback system is provided for a client terminal 10, and works in conjunction with third-party search engines 110 provided over a network 105. The media playback system may communicate with one or more network search engines to search and playback streaming media from media files 120 available over network 105.

The media playback system may be implemented as a client system on terminal 10. The media playback system includes a user-interface module 20, a search module 30, and a media player 40. A media player user-interface 45 may be associated with the media player 40. The media playback system may be implemented over the Internet, and the search engines 110 may correspond to web-based search engines capable of locating media files.

In an embodiment, user-interface module 20 displays a user-interface to prompt the user into inputting a request for media playback. The request for media playback may set forth criterias from the user for selecting a specific category or type of media playback. The request is signaled to search module 30, which then converts the request to a network query for each of the search engines 110. The search module accesses a search engine rule module 35. The rule module 35 includes pre-stored instructions for converting requests to network queries. Preferably, the rule module 35 includes one or more sets of rules or instructions for converting requests from user-input into queries specific to each of the search engines 110. The rule module 35 is also accessible to editors and/or programmatic interfaces for purpose of updating rule sets and logic used to communicate with search engines 110. Thus, the rule module is adaptable to communicate with new search engines, or with existing search engines using new technology or programming.

The media playback system communicates with multiple network sites that host network search engines 110. The search module 30 signals the network queries to the search engines 110 to cause the search engines to locate streaming media resources over network 105. The search results are signaled from search engines 110 back to search module 30. The search module 30 identifies media links that are selectable to open media files from the search results. The search module 30 signals the links to the media player 40. Upon being signaled, media player 40 accesses and loads the media files opened by each of the links. In this way, media player 40 plays back streaming media from the links, and uses the media player interface 45 to display metadata information about the media file in use.

In an embodiment, a web browser may also be used to display a network page located by the link signaled to the media player 40. The web browser may display the network page where the streaming media being played back originates. Among other advantages, this enables the user of client terminal 10 to view advertisements copyright notices, and links to other site available on the network site hosting the streaming media being played back.

As an example, the client terminal 10 may be operated to access streaming media over the Internet. The query is signaled by search module 30 to multiple Internet search engines, each of which return search results. The network location (or URL) of media files matching the query are identified by search module 30 from the search results of the Internet search engines. The location of the media files is then signaled from the search module 30 to the media player 40.

In this way, the media playback system causes media player 40 to continuously and automatically play back streaming media from resources located on the network 105. For Internet applications, media player 40 may be signaled to programmatically access and load media files from websites having different domains, thereby minimizing the possibility that network failure would interfere with the media playback system. Furthermore, the media player 40 may be controlled in the background of client terminal 10, enabling a user to use other resources of client terminal 10 while the media playback system is in operation.

Figure 2:
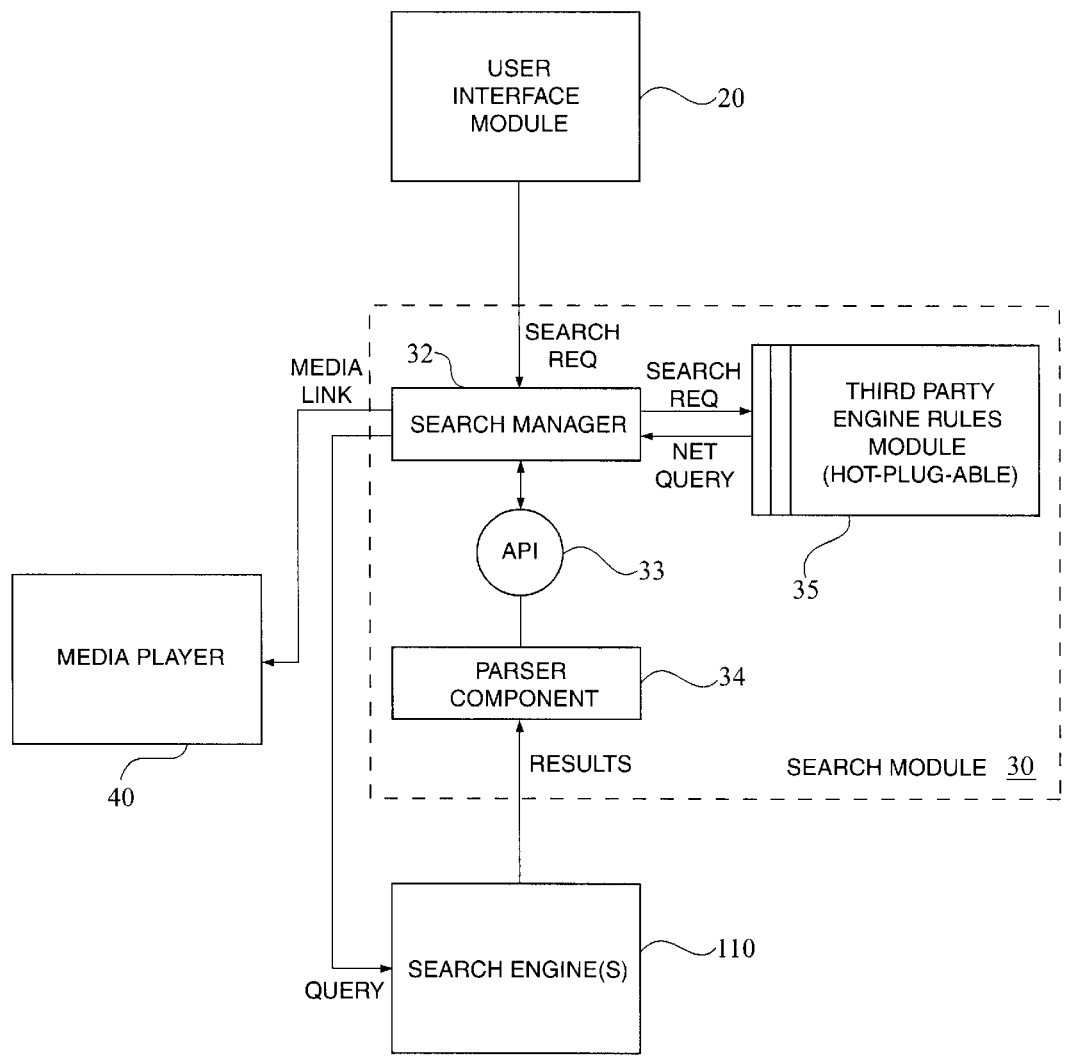
FIG. 2 illustrates a search module for signaling network queries and parsing search results, under an embodiment of the invention.

FIG. 2 illustrates components of search module 30, under an embodiment such as shown with FIG. 1. The search module 30 includes a search manager 32 that controls a parser component 34. Preferably, the search module 30 is integrated with a web browser component residing on client terminal 10. The search manager 32 programmatically controls the web browser through an application program interface (API) 33 to perform functions of parser component 34.

The search manager 32 receives a request for media playback. The search manager 32 may receive the request from user-interface 20. In response, the search manager 32 accesses rule module 35 to convert the request to a network query for search engine 110. If multiple search engines 110 are being used, the rule module 35 provides instructions for converting the request to a network query that is specific for each of the search engines 110.

The rule module 35 converts the user's request to one or more network queries, specific for each search engine 110 accessed by the media playback system. The rule module 35 may include multiple rule sets, with one rule set for each search engine. The search manager 32 signals the network queries to one or more third-party search engines 110 (FIG. 1).

To illustrate use of search module 30 under an embodiment of the invention, the media playback system may have access to a first web-site providing a first Internet search engine, and a second web-site providing a second Internet search engine. The search module 30 converts a user's request, entered through the user-interface 20, into queries formatted specifically to each of the first and second web-sites. The query for each of the web-sites is formatted to include logic specific to enable that particular search engine to process the user's request. Specifically, search module 30 queries to the search engine of the first web-site a URL having parameters, formatting, and other embedded logic to enable that web-site to process the user's search request. Likewise, search module 30 queries to the search engine of the second web-site a URL having parameters, formatting, and other embedded logic to enable that web-site to process the search request.

Each network search engine signaled by search module 30 returns a search result. The search result may be in the form of one or more HTML (or other web-based language) pages, each of which contain a collection of URL links. The search results may be determined by the respective search engine 110 as being selectable to open media files matching the user's search request. The search module 30 receives the search result from each network search engine 110. The response to the network queries from the search engines 110 are then signaled to the parser component 34. The parser component 34 may be configured to parse the search results of different network search engines using logic that is specific to each network site. The parser component 34 identifies, from search result provided by each search engine 110, URLs that can be signaled to media player 40 to automatically cause media player 40 to locate and playback streaming media matching the search request.

In an embodiment, parser component 34 accesses logic from rule module 35 to recognize the arrangement of links locating media files, as well as, for example, the location and manner of advertisement appearing on search results from that search engine. If multiple network sites are queried together from one user search request, the search results can then be parsed automatically using the parser component 34. The media links identified by the parser component 34 are signaled to media player 40 by the search manager 32.

Each URL signaled from search engine 110 has a network protocol. For media files, and specifically audio media resources, types of protocols include "HTTP" protocol, "PNM" protocol (RealNetworks, having .RM extensions), or "RTSP" protocol (having .RAM extensions). The URLs signaled from search engines 110 include the protocol at an initial portion of the string forming the URL. Preferably, for HTTP protocol files, the string portion corresponding to "HTTP" is replaced with "PNM". This adjustment prevents media player 40 from failing as a result of a bug in the media player 40, particularly if the media player 40 is a RealNetworks Player™.

In an embodiment, a web browser is controlled through API 33 to act as the parser component 34. The web browser may, for example, be a controlled or pre-configured version of a commercially available web browser. Examples of such web browsers include Netscape Navigator® and Internet Explorer®. In an embodiment, the web browser is controlled by the manager module to locate search engines on the Internet.

Figure 3:
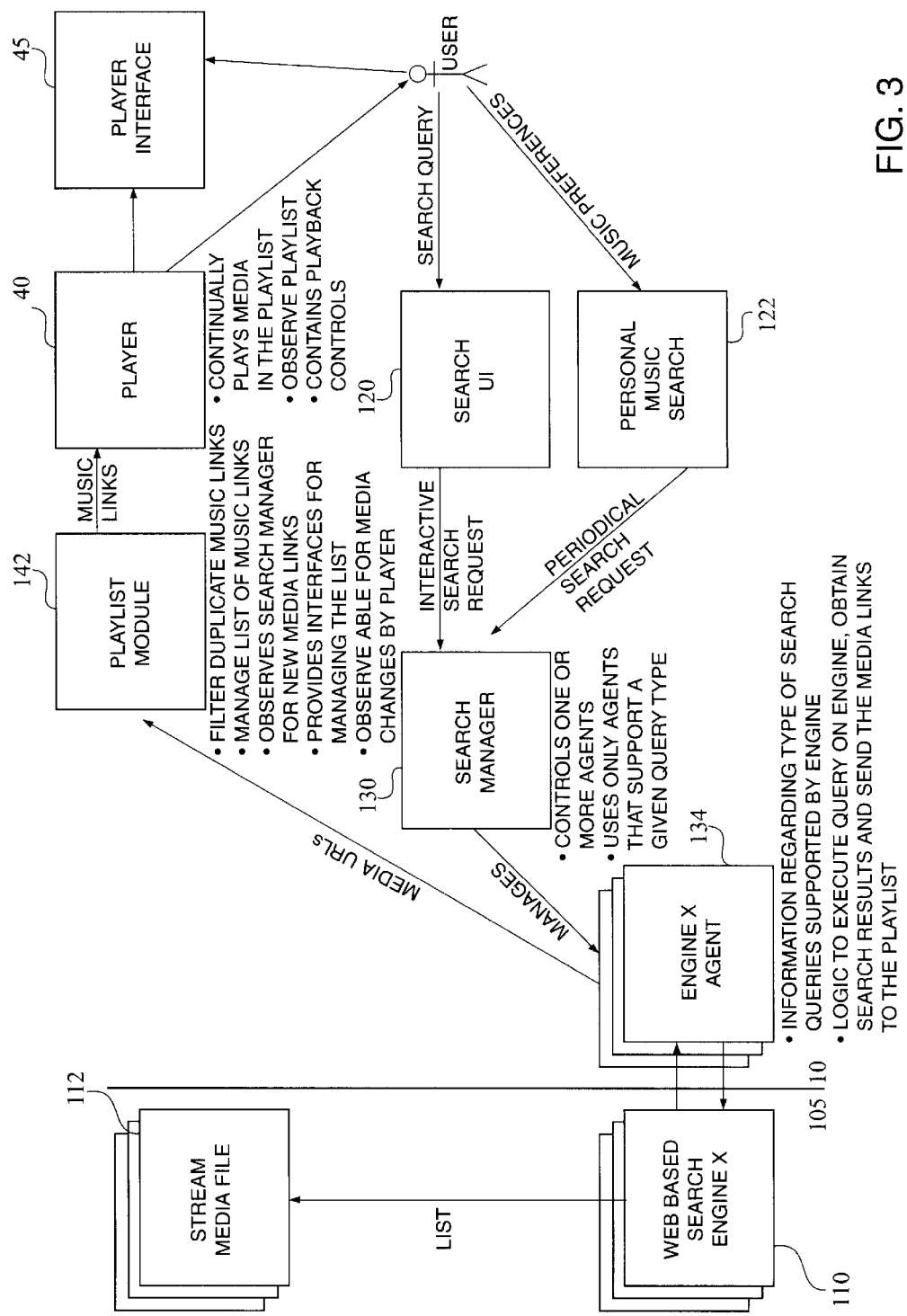
FIG. 3 illustrates another architecture illustrating additional features of the media playback system, under an embodiment of the invention.

FIG. 3 illustrates a media playback system, under another embodiment of the invention. The media playback system illustrated by FIG. 3 enables a user of terminal 10 to retrieve and playback streaming media from network 105. The network 105 may correspond to the Internet. In an embodiment, the media playback system is coupleable to a plurality of search engines 110. The search engines 110 locate streaming media files 112 on the Internet for playback on the client terminal 10.

The media playback system of FIG. 2 includes a search user-interface 120 and a preference module 122. The search user-interface and the preference module are each capable of generating a request for media playback. The media playback system also includes a search manager 130 that controls a plurality of engine agents 134. Each engine agent 134 provides logic to convert the generated search request into a network query. The logic provided by the engine agent 134 is specific to a particular Internet search engine 110. The engine agents 134 also identify media links selectable to open media files from results signaled from the search engines 110, in response to network queries.

A playlist module 142 arranges media links identified by the engine agents for a media player 40. The playlist module 142 is used to signal media links to media player 40 in an arranged format. The playlist module 142 also filters the media links received from search engines 110 for media player 40. The media links are identified from the search results provided by search engines 110.

The user can signal the search user-interface 120 to generate a search request specifying criterias used to locate specific streaming media on the Internet. In one embodiment, user-interface module 120 prompts the user to enter a search request by providing a text-field for user's to enter search terms. One or more menu items may specify categories of media playback to assist selecting or narrowing the search term. For example, a user may enter a keyword for a song title as a search term, and select a menu item for a genre of music where the song title is likely to found.

The preference module 122 programmatically determines or generates a search request specifying one or more criterias used to search the Internet for streaming media. In an embodiment, preference module 122 periodically generates and signals search requests to the search manager 130. In an embodiment, the preference module 122 periodically signals a stored or predetermined search request to search manager 130. For example, preference module 122 stores search terms previously entered by the user. Periodically, the preference module 122 signals one or more of the pre-stored search terms to search manager 130.

In another embodiment, the preference module 122 observes search terms manually entered through search user-interface 120. The preference module 120 may also observe the media retrieved from the network in response to past searches. The observe preferences are then used to determine future search requests. Thus, preference module 122 may be used to generate the search request based on past search requests or media playback.

The preference module 122 may also automatically generate a search request for streaming media based on a user's action. Alternatively, the user may specifically signal to cause preference module 122 to signal a pre-stored search request to search manager 130. As an example, the user may configure the media playback system to store favorite music artists or albums. The user then signals the media playback system to playback preferred streaming media. The search request generated in response to the user signaling the media playback system corresponds to one of the user's preferred artist or album.

Still further, preference module 122 may be signaled to generate a search request based on the user's preferences by one or more actions of the user. For example, the user may open an application on terminal 10 that operates or is otherwise associated with the media playback system. In response to the user's action, the preference module generates the search request and signals it to the search module. As another example, the user may configure the media playback system to playback classical music when a residing web browser or word process or is operated. Thus, once the web browser or word processor are launched, the preference module 122 generates a search request specifying classical music.

The search manager 130 receives the search request generated by either the search user-interface 120 or the preferred module 122. The search manager 130 controls a plurality of engine agents 134 to convert each search request to a network query for the search engines 110. In an embodiment, engine agents 134 controls a web browser component to perform functions described herein using one or more rule sets of the rule module 35. Alternatively, engine agents 134 may be modules including logic to convert search requests to network queries for specific search engines 110, as well as logic to parse search results from the specific search engines.

Each network query formed by one of the engine agents 134 is a uniform resource locator (URL). The URL queried to each search engine 110 includes an address to locate the particular search engine 110 on the Internet. The address includes a domain portion. The URL queried to each search engine also includes a query portion, including criterias set forth in the search request. Each search engine 110 may require the query portion of the URL to include a particular format or logic specific to that search engine. The media playback system may include a plurality of engine agents 134, each of which correspond to a search engine 110 queried by the media playback system. The search manager 130 controls the different engine agents 134 to generate network queries for each search engine 110, based on the search request from either the search user-interface 120 or the preference module 122.

When queried, each search engine 110 returns one or more web-pages as the search result. The engine agent 134 for each search engine 110 parses the corresponding web-pages for media links that are selectable by the media player 40 to playback streaming media. The identified media links are signaled to playlist module 142. The playlist module 142 arranges the media links into a playlist for media player 40.

If a search engine 110 returns multiple web-pages as the search result, the corresponding engine agent 134 may be programmed to identify an indication that one or more web-pages are included in the search result. The indication from the search result may be a link to another web page that provides media links matching the query to the search engine. The links to the other page of search results is in a format provided by that search engine 110. For example, the link to the next web-page of search results may be labeled "Next Page". In an embodiment, engine agents 134 parse each web-page individually for media links and signal the identified media links to playlist module 142. When a page of a search result is parsed by one or more of the engine agents 134, an indication to another page of results may be identified by that engine agent. After the media links from one of the web-pages contained in the search results are signaled to the playlist module 142, the engine agents 134 then select to receive the next page of results from the corresponding search engines 110. The next web-page of search results are received by engine agents 134 while the playlist module is signaling media links to the media player 40.

In an embodiment, playlist module 142 filters the media links from the different search results of search engines 110 for duplicate links. The playlist module 142 arranges the remaining media links into an order for playback. The order may correspond to a priority order for each media link as designated by search engines 110. This may be determined by examining the order and priority information returned with the search result from each search engine 110. Typically, search results returned from search engines 110 are returned in an order of priority. For example, some search engines return links an order indicating how well the file associated with the link matches the criterias in the query. The search results may also be provided with a number that quantitatively indicates how well the associated file of the media link matches the criterias of the query. The order and priority information provided by search engines 110 is used by playlist module 142 to set the order of playback for the combined search results.

The playlist module 142 signals a media links from a playlist to the media playback module 140. From the perspective of the user, the media links are signaled from the playlist module 142 and played back by the media player 40 in response to the search request inputted by the user or generated by the preference module 122. In an embodiment, playlist module 142 signals the media links sequentially to media player 40 according to the order of the corresponding playlist. Thus, once the media player 40 has loaded a media file of a first link, the playlist module may signal a second media link from the playlist to media player 40.

In an embodiment, playlist module 142 includes an interface to enable the user to manage the playlist. Each playlist may be managed by the user while one of the media files is being processed by media player 40. For example, the user may preview the playlist while one of the media files is being played back, and discard or rearrange the order of the remaining media files.

The media player 40 displays information about the media being played back on media player interface 45. The information being displayed may be metadata information provided by the media links. The media player interface 45 may also display controls to allow the user to control the playback of media. For example, the controls may enable the user to skip media links in the playlist being used. The controls may also allow the user to stop media playback, to repeat media playback for a particular media file etc.

A media playback system such as shown and described by FIG. 3 may perform functions in a background of terminal 10, hidden from the user. The media links signaled sequentially from playlist module 142 require a certain duration of time to be played back. While one media file is played back, engine agents 134 may be used to retrieve additional media links. For example, engine agents 134 may retrieve multiple web-pages representing a single search result from one of the search engines 110, while one of the media files is being loaded and played back with the media player.

Similarly, search manager 130 may receive additional requests for media playback from either user-interface 120 or the preference module 122. The engine agents 134 may be generating new network queries while streaming media is being played back from another network query.

C. Flow Processes for Implementing and Using Media Playback System

FIGS. 4–8 illustrate flow processes describing operations of a media playback system, such as described by FIGS. 1–3. Reference to numerals of FIGS. 1–3 is intended to illustrate exemplary components for performing a stated task or function.

Figure 4:
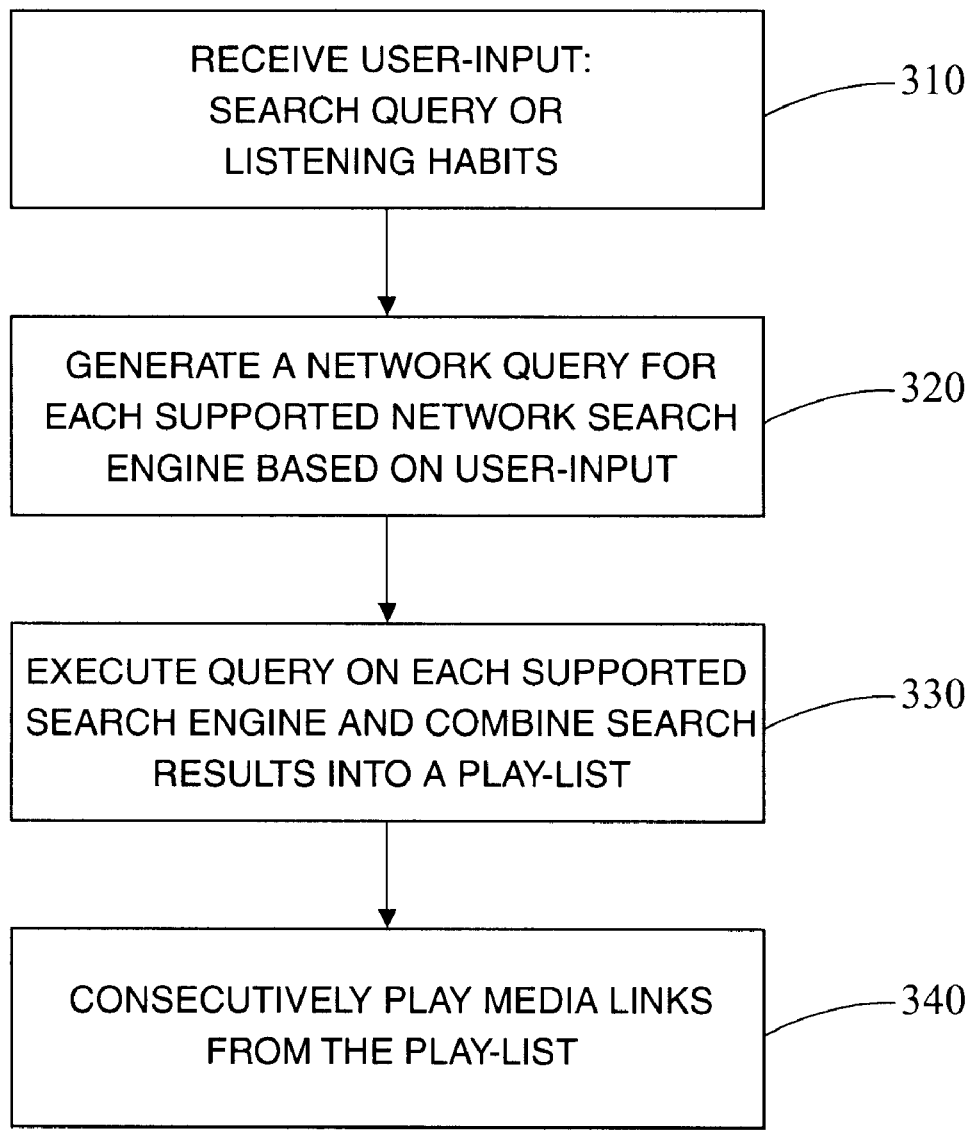
FIG. 4 is a flow process for operating a media playback system, under an embodiment of the invention.

FIG. 4 is a process describing a media playback system operated on client terminal 10, under an embodiment of the invention. In step 310, user-input is received for generating a request to receive streaming media playback. The user input may be a search query, specified by, for example, keywords and search terms entered through the user-interface. Alternatively, the query may be generated through a user's actions, such as designated through a listener's habits or pre-specified preferences.

In step 320, a network query is generated from the user-input. The user-input is signaled to the search module 30. In response, the search module 30 accesses rule manager 35, storing pre-defined instructions and/or logic to convert the user-input request to a network query specific to each of the search engines 110.

In step 330, the search module 30 combines the search results from each of the search engines 110. Preferably, the search results are combined to identify only links that directly locate streaming media. These links are selectable to immediately access and open media files. In use with media player 40, the links identified from the search result are selectable to output streaming media on client terminal 10.

In step 340, the links identified from the search results are consecutively played back on the client terminal 10. This is accomplished by signaling the links identified from the search results to the media player 40. Upon receiving each links, the media player automatically accesses and plays back streaming media located by that link.

Figure 5:
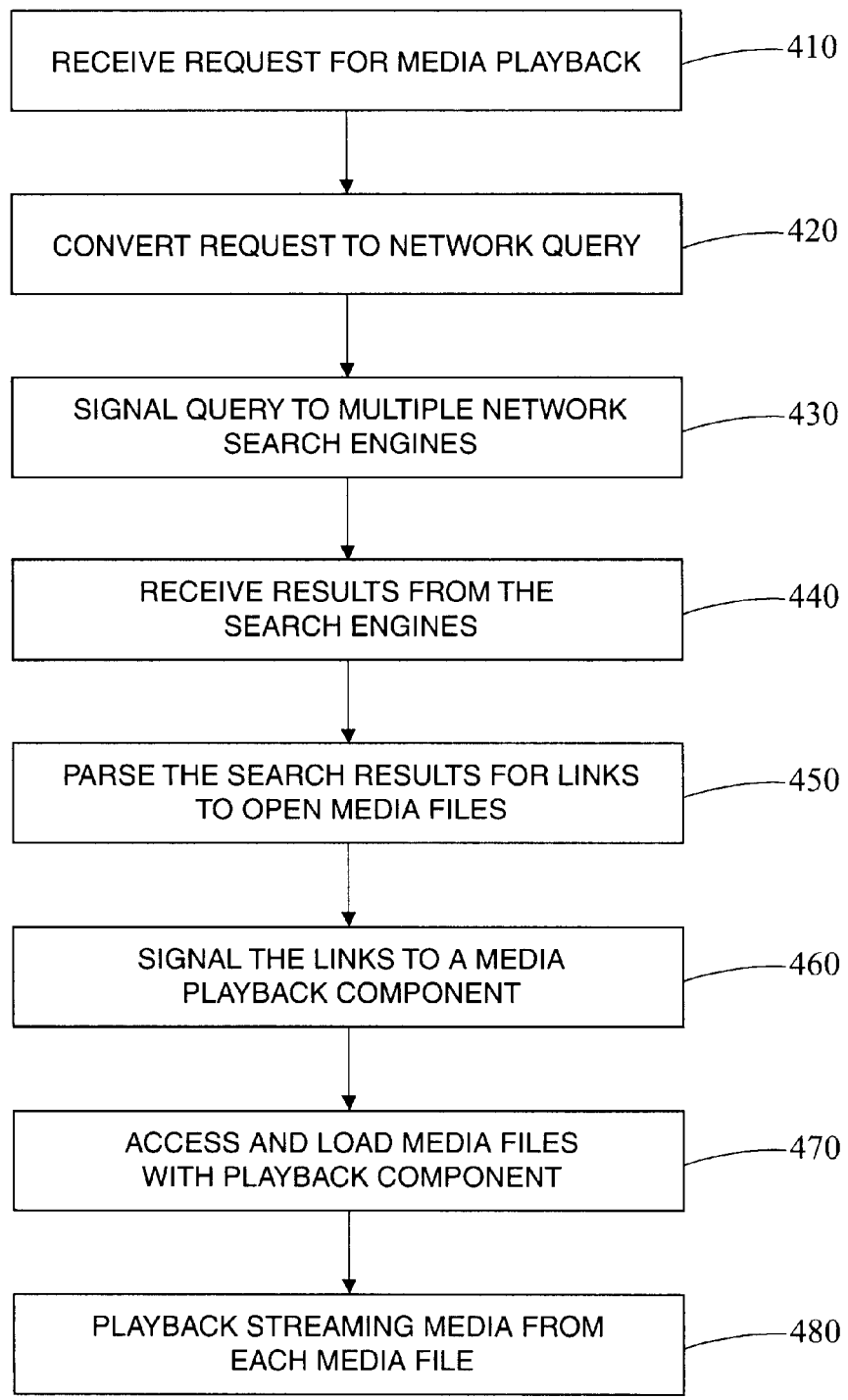
FIG. 5 illustrates another flow process for operating a media playback system that parses search results returned from third party search engines, under an embodiment of the invention.

FIG. 5 is a more detailed flow process for operating a media playback system such as shown by FIG. 1, under another embodiment. In step 410, a request for media playback is received on client terminal 10. The request may be for the media playback system to search for media files on network 105 according to criterias or search parameters set forth by the user. The criterias identified by the user for retrieving streaming media may include, for example, user-inputted search terms, categories, genre, artist name, media titles, quality of media playback, duration of media playback, type of data file containing media, etc.

In step 420, a network-query is generated in response to the request entered through the user-interface module 20. In an embodiment, search module 30 receives the request from the user and accesses the search engine rule module 35 to convert the request into network-queries for search engines 110. The request is converted to separate individual network-queries, with one network-query for each third party search engine 110 used by the media playback system.

In step 430, each network query generated by search module 30 and rule module 35 is signaled to the corresponding search engines 110 on network 105. Multiple third-party search engines 110 enable the media playback system to operate proficiently in the event that one or more of the search engines 110 are unavailable.

In step 440, search results are received from each of the search engines 110. The search result from each search engine 110 may be in the form of one-or more web-pages, with each web-page including a plurality of media links. The media links are selectable to open media files. The web-page containing search results may also include links to advertisers and other network resources, as well as links to media files that are old, broken, and unavailable.

In step 450, the search results are parsed to separate the media links from other links included with the search results. For example, web-pages returned from search engines 110 may include one or more links to advertisers, images and other links to sites internal to the particular search engine. The web-pages are parsed to locate only those links that are selectable to open media files.

In step 460, the links identified after parsing the search results are signaled to media player 40. In an embodiment, results returned from each search engine 110 are parsed using logic specific to that search engine 110. For example, search results from one search engine 110 may include links internal only to the home page of that search engine. The search results may also include images, logos, advertising information in a format or arrangement that is specific for the search engine 110. The logic used to parse search results from different search engines individually includes logic that has been pre-configured to account for the differences in the results returned from the search engines 110.

As another example, search results from some Internet search engines may be provided on more than one web-page. These web-pages may be parsed with logic that is configured to identify the link to a next page of search results from that search engine 110.

In step 470, the media player 40 access and loads the media files located by each of the links identified in the search results. Then, the media player plays back streaming media from each loaded file in step 480.

In an embodiment, the links may be signaled sequentially to the media player, upon the media player loading a media file associated with each link. For example, once the media player loads a media file from one link identified from one of the search results, another one of the links from the search results may be signaled to the media player.

Figure 6:
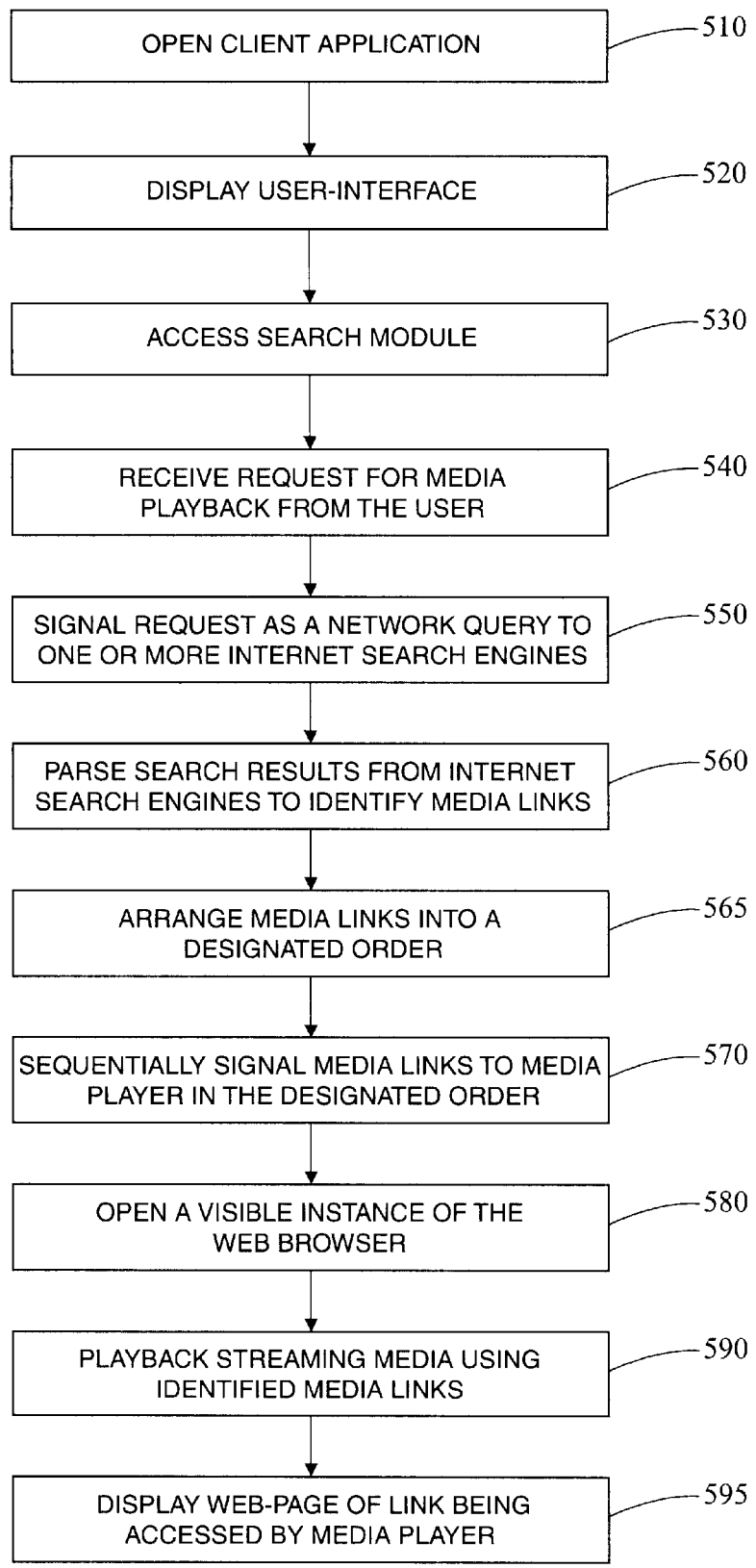
FIG. 6 illustrates another flow process for operating a media playback system to display a web page of a media file being accessed by a media player, under an embodiment of the invention.

FIG. 6 illustrates an exemplary method in which a media playback system such as described with FIG. 1 is operated with user-interaction in the background of client terminal 10. For purpose of discussion, the media playback system is assumed to provide music from the Internet.

In step 510, the user signals to open the client application for the media playback system. The client application may be opened through a manual selection by the user. Alternatively, the client application may be opened automatically, in response to another action by the user. In step 520, the user-interface is displayed on client terminal 10 by user-interface module 20.

In step 530, search module 30 is accessed. The search module may be accessed in background of client terminal 10. In an embodiment, search module 30 is integrated with or provided as a web browser. Accessing search module 30 may include opening a hidden instance of the web browser. A visible instance of the web browser may also be opened, as described with step 595.

The user may enter a request for media playback, which is then signaled to search module 30 in step 540. The request may specify, for example, an artist name. The user may type in the artist's name, or use key words using appropriate search fields provided by the user-interface module 20.

The search module 30 uses rule module 35 to signal the request as a network query to one or more network search engines in step 550. In step 560, search module receives the search results, and parses the search results to identify links selectable to open media files matching the search request. The parser 34 may be the hidden instance of the web browser.

In step 565, search module 30 arranges links identified from the search results into a playlist. The playlist is in an order in which the links identified from the search results are signaled to the media player 40.

In step 570, links identified in the search results are signaled to media player 40 in the order determined by the playlist. In step 580, a visible instance of the web browser is opened. In step 590, media player 40 plays back streaming media using the links. Concurrently in step 595, a visible instance of the web browser is used to display a web page of link being accessed by media player 40. The media player 40 continuously plays back streaming media using different media links identified from search engine 110.

Figure 7:
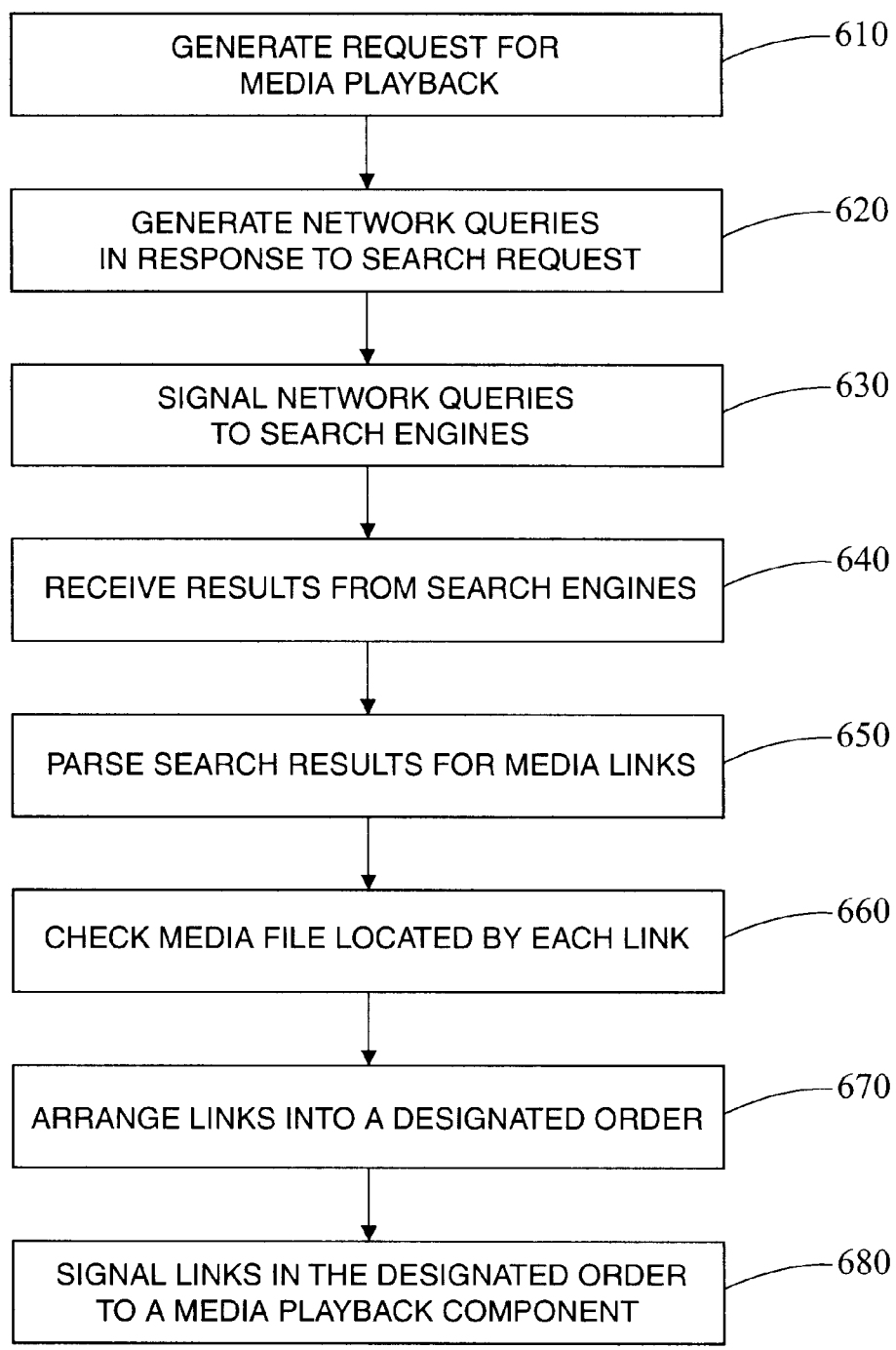
FIG. 7 illustrates another flow process for operating a media playback system so as to playback streaming media in an arranged order, under an embodiment of the invention.

FIG. 7 illustrates another embodiment in which the media playback system generates network queries from user-input or preferences, and arranges a playlist designating an order for media playback of media links. The system is assumed to be able to communicate with search engines 110, as described with FIGS. 1–3.

In step 610, a request for media playback is generated. The request for media playback may be a user-input, such as entered through user-input 120. The user-input may specify criterias for search engines 110.

In step 620, one or more network queries are generated from the search request. Each of the network queries includes logic specific to a search engine 110 on the network. In step 630, separate network queries are signaled to the one or more search engines 110. Each network query includes logic specific for the search engine 110, so as to enable the search engine to process a search using one or more criterias set forth in the search request. The search performed by search engines 110 is for media files matching the criterias of the search request.

In step 640, results are received from search engines 110. The search results include media links. The media links are such that each are selectable to open media files. When signaled to the media player 40, for example, the media links locate files that can automatically be loaded by media player 40 to output steaming media. The search results may also include other network resources and internal links, such as for example, advertisement images or links, links to affiliate sites, and other links internal to a domain of that search engine 110. The engine agent 134, for example, may identify suffix or HTML pages in the search results returned from search engines 110 to identify links to streaming media.

In step 650, the results received from each search engine 110 are parsed for media links. The media links are identified from, for example, advertisement links and images, links to affiliates, and internal links to the domain of that search engine 110. The search results may be parsed using a modified commercial web browser. The media links may be identified from the search results using metadata information provided by each link in the search result. The metadata may, for example, specify the data type of the file being located by that link.

In step 660, each file located by the media link may be checked. The media link may, for example, be checked to determine if the media link is broken or unavailable. To accomplish this step, each media link may be signaled from, for example, playlist module 142 to an invisible instance of media player 40. If the invisible instance of media player 40 is able to load a media file associated with that media link, then the media link is verified.

In addition, the invisible instance of media player 40 may be used to identify metadata information associated with the media file. The metadata information may be used to check that the media file is supposed to be signaled to media player 40. For example, the metadata information of the media links may ensure that the links are of sufficient length. As an example, if music clips are being played back, the metadata information of the music clips may be used to identify whether the media clip is less than a minute long. If the music clip is less than a minute, the music clip can be assumed to be promotion al or incomplete, and discarded.

In step 670, the media links may be arranged in a designated order. This step may be accomplished by playlist module 142. In step 680, the media links identified from the results of search engines 110 are signaled to media player 40. Preferably, the media links are signaled to media player 40 sequentially, in an order determined by playlist module 40.

In this way, media player 40 plays back streaming media continuously from different media sites on the network. In an implementation, media player 40 may automatically playback streaming media continuously from different network sites that access media files. One or more of the addresses used to locate media files for media player 40 may include separate domains. Further, the addresses used to locate the different streaming media files may be located by different search engines 110. Many search engines 110 have access to databases having different collections of streaming media, Another advantage provided by a media playback system described with embodiments of the invention is that they can be used to aggregate the various databases for streaming media matching a user's request..

D. Alternative Embodiments

Embodiments described with FIGS. 1–3 assume a client terminal 10 equipped with modules and other components forming the media playback system. In other embodiments, one or more of the components described above may be employed on a server, rather than the terminal. For example, search manager 32 may be provided on a server. The search manager 32 is signaled the search request, and forms the network query on the network side. The network queries to the search engines 110 is then signaled from the server, rather than the client.

The search manager 32 may control a web browser on the client terminal 10 to parse the search results from the different search engines 110. The search manager 32 may signal API 33 of a web browser to parse the search results. In other embodiments, however, parser component 34 is employed on the server as well, rather than on client terminal 10.

Similarly, the components of media playback system shown by FIGS. 1 and 3 may be employed on servers that communicate with terminal 10. The components may combine to signal network queries to third party search engines 110. The network media playback system may parse the search results from search engines 110, and then signal media links to media player 40.

In one embodiment, media player 40 resides on client terminal 10 to playback streaming media for the user. The user-interface module 20 also resides on terminal 10, while all other modules and components of the media playback system reside on a server that is coupleable to the terminal 10.

In another embodiment, a recommendation module is implemented with the media playback system. The recommendation module suggests or recommends search requests for the user. The recommendation module is a rule-based system that recommends media for the user based on user-interaction with the media playback system. Preferably, the recommendation module resides on a server that communicates with terminal 10. The recommendation module may be coupleable to the search manager 130, in a media playback system such as illustrated with FIG. 3.

In one example, the recommendation module may observe search criterias inputted by the user, and/or observe media playback experienced by the user. The recommendation module generates requests for the user based on the observations. The recommendation module may, for example, signal a recommended search criteria or term to search manager 130 (in a system such as shown by FIG. 3). The recommendation module causes the search manager 130 to search for specific media links through recommendations based on previous user-interaction. Alternatively, the recommendation module may signal the search request based on previously provided information, preferences, or configurations provided by the user of terminal 10.

In one example, the recommendation module observes a user's request for a particular artist. The recommendation module uses a rule-based system or logic to suggest another artist that may interest the user. Similarly, the recommendation module may observe that the user prefers a particular genre, like classical music. The recommendation module may suggest another type of genre, such as classical jazz, or alternatively a particular sub-genre (such as modern classical music), for the user.

The suggestions and recommendations from the recommendation module may be signaled automatically to search manager 130 for playback. Alternatively, the recommendations may be signaled to the user for user-selection or input before being forwarded to the search manager 130.

In this way, the recommendation module may act as smart-agent to help the user discover new music. The recommendation module also encourages the user to visit new network sites hosting media links.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A media playback system comprising:
   a search module that signals a search request to a first network site to receive a search result, and in response to receiving the search result, identifies a plurality of media resource locators for locating media resources on the network, including a first media resource locator for locating a first media resource at a second network site, and a second media resource locator for locating a second media resource at a third network site; and
   a media player coupleable to the search module to play back the first media resource using the first media resource locator, then to substantially automatically play back the second media resource using the second media resource locator.

2. The media play back system of claim 1, wherein the search module is configured to parse the search result for the first media resource locator and the second media resource locator.

3. The media playback system of claim 1, wherein the search module signals the search request to a media directory comprising a plurality of addresses, each address locating a network site for accessing a media file, the search module retrieving from the media directory at least the first media resource locator corresponding to a first network address of the second network site, and the second media resource locator corresponding to a second network address of the third network site.

4. The media playback system of claim 3, wherein the search module uses an Hypertext Transfer Protocol interface to signal the search request.

5. The media playback system of claim 1, further comprising a user-interface to receive a user-query, and wherein the search request signaled by the search module is based on the user-query.

6. The media playback system of claim 5, wherein the search module signals the search request to the first network site using one or more search fields identified from the user-query.

7. The media playback system of claim 6, wherein the search request signaled by the search module includes one or more search fields selected from the group of search fields consisting of an artist name, a media title, a genre of media, and a type of media file.

8. The media playback system of claim 1, wherein the search module includes a web browser component that is configured to automatically display a first web site that is located by at least one of the media resource locators in the search result while playing back streaming media from a media file opened by the at least one media resource locator in the search result.

9. The media playback system of claim 1, wherein the search module signals the search request to the first network site to identify one or more media files containing audio digital recordings.

10. The media playback system of claim 1, wherein the search module signals the search request to the first network site to identify media resource locators to media resources containing video and/or audio digital recordings, and wherein the media player loads the first media resource and the second media resource to play back the video and/or audio digital recordings.

11. The media playback system of claim 1, wherein the search module signals the search request to a search engine located at the first network site, the search request being in the form of a uniform resource locator; and wherein the search module receives the plurality of media resource locators in the form of uniform resource locators from the search engine.

12. The media playback system of claim 1, wherein the first network site, the second network site and the third network site each have a different address for locating that site on the network, so that the media player is coupleable to the search module to play back streaming media from the second network site, then automatically the third network site.

13. The media playback system of claim 12, wherein at least the second network site and the third network site each have a common network location, and wherein the media player is coupleable to the search module to identify and play back the first media resource from the common network location using the first media resource locator, then to automatically play back the second media resource from the common network location using the second media resource locator.

14. The media playback system of claim 13, wherein the common network location has a common network address domain for locating a plurality of network sites at the common network location, including the second network site and the third network site.

15. The media playback system of claim 13, wherein the common network location has a common server for providing a plurality of network sites, including the second network site and the third network site.

16. The media playback system of claim 12, wherein the first network site, the second network site, and the third network site each have a common network location.

17. A media playback system operated on a terminal coupled to a network, the media playback system comprising:
  a search module that signals a user-defined search request to one or more network sites to receive one or more search results the one or more search results identifying a plurality of media resource locators, each of the media resource locators locating at least one media resource at one or more network sites; and
  a media player coupled to the search module to automatically access and load at least some of the media resources located by the plurality of media resource locators, so as to substantially automatically and sequentially play back media from the at least some of the media resources located by the plurality of media resource locators.

18. The media playback system of claim 17, wherein the one or more search results received by the search module include at least a first link for locating a first media file at a first network site, and a second link for locating a second media file at a second network site, and wherein the media player automatically accesses and loads the first media file using the first link and the second media file using the second link, so as to automatically and sequentially play back streaming media from the first media file and the second media file.

19. The media playback system of claim 18, wherein the first network site has a first domain address, and the second network site has a second domain address that is different than the first domain address, so that the media player is configured to automatically and sequentially play back streaming media from the first domain and the second domain.

20. The media playback system of claim 17, further comprising a user-interface to receive a user-query for formulating the search request to each of the one or more network sites.

21. The media playback system of claim 20, wherein the user-query comprises one or more search strings or menu selections.

22. The media playback system of claim 21, wherein the user-query is a request for streaming media playback of a specified category.

23. The media playback system of claim 21, wherein the user-query is signaled automatically in response to a user of the terminal opening a web browser.

24. The media playback system of claim 17, wherein the search module formulates a user-query into the search request directed to the one or more network sites.

25. The media playback system of claim 24, wherein the search module formulates each search request so as to include a uniform resource locator including metadata information specific to a corresponding one of the one or more network sites for receiving the search request, the metadata information being derived from the user-query.

26. The media player of claim 25, wherein the search module formulates each search request into the uniform resource locator to include an address to the corresponding one of the one or more network sites, and arguments to search for streaming media on the corresponding one of the one or more network sites.

27. The media playback system of claim 26, wherein the search module includes a parsing component to parse each of the one or more search results for links that are selectable to open media files.

28. The media playback system of claim 17, wherein the search module formulates a user-query into a plurality of search requests, each of the plurality of search requests being directed to one of the one or more network sites.

29. The media playback system of claim 17, wherein the search module signals at least a portion of the one or more search results to a play-list module, the play-list module arranging a plurality of media resource locators from the portion of the one or more search results into a designated order, each of the plurality of media resource locators providing a network address for a corresponding media file, the playlist module signaling the plurality of media resource locators to the media player in the designated order.

30. A media playback system coupled to a network, the media playback system comprising:
  a user-interface to receive a user-query;
  a search module to signal the search request to one or more network sites, and to receive from the one or more network sites at least a first search result that references a plurality of media resources, each of the media resources having a corresponding network location; and
  a media player configured to access the network locations of at least some of the media resources referenced in the first search result, and to substantially automatically and sequentially play back the at least some of the media resources referenced in the first search result.

31. The playback system of claim 30, further comprising:
  a parsing component to parse one or more search results signaled back from a network search engine at each of the one or more network sites, the one or more search results containing a plurality of links that are selectable to open media files; and
  wherein the parsing component implements a separate parsing logic for parsing the search result from the network sites.

32. The playback system of claim 31, wherein the first search result includes a plurality of network pages, each of the network pages containing one or more links that are selectable to open media files, and wherein the parsing component parses each page of the first search result to identify the plurality of links for that network site.

33. The playback system of claim 32, wherein the parsing component detects a next page link on a first page of the first search result using a first parsing logic, and in response to detecting the next page link, uses the first parsing logic to parse a second network page of the first search result.

34. The media playback system of claim 30, wherein the search module is configured to identify a plurality of links contained in the first search result, and wherein the media player is configured to select at least some of the plurality of links in order o open a plurality of media files, so as substantially automatically and sequentially play back streaming media from at least some of the plurality of media files.

35. The media playback system of claim 34, further comprising a browser component configured to display a network page associated with one of the plurality of media files while the media player is playing back streaming audio from that media file.

36. The media playback system of claim 30, wherein the search module is configured to receive from the one or more network sites at least the first search result that references a plurality of audio files.

37. A method for playing back streaming media on a terminal coupleable to a network, the method comprising:
  receiving a query from a user of the terminal;
  signaling a search request based on the query to a network site;

receiving from the network site a search result containing one or more media resource locators, each of the one or more media resource locators being able to locate a media resource on the network; and signaling the media resource locators so as to enable one or more of the media resource locators in the search result to be designated for a play-list that is accessible to the media player in order to substantially automatically and continuously play back at least a portion of the play-list including a plurality of the media resources that are located on the network by the media resource locators.

38. The method of claim 37, wherein signaling the media resource locators to a media player includes signaling one or more links to the media player, each of the one or more links being selectable to open a media file, so as to enable the one or more links to be designated for the play-list that is accessible to the media player in order to automatically and continuously play back media files that are opened by the media player upon the media player being directed to select the links in the play-list.

39. The method of claim 37, wherein receiving a query includes receiving a search string entered by the user.

40. The method of claim 39, wherein receiving a query from a user of the terminal includes prompting the user of the terminal for the query through a user-interface appearing on a display of the terminal.

41. The method of claim 40, wherein prompting the user includes displaying a text-entry field on the user-interface for the user to enter a search term.

42. The method of claim 37, wherein signaling the query to a network site includes signaling the query to an Internet search engine.

43. The method of claim 37, wherein the media resource locators include links to media files, and wherein the method further comprises parsing the search result to identify links on the search result that are selectable to open one or more media resources.

44. The method of claim 37, wherein receiving from the network site a search result includes receiving from the network site one or more network addresses, each of the one or more network addresses locating a corresponding media resource on the network, and wherein signaling the media resource locators includes indicating the one or more network addresses to the media player.

45. The method of claim 44, wherein receiving from the network site one or more network addresses includes receiving a plurality of network addresses for locating a plurality of media resources stored at a common network location.

46. The method of claim 45, wherein receiving a plurality of network addresses includes receiving two or more network addresses having a common network address domain.

47. The method of claim 46, wherein receiving a plurality of network addresses includes receiving at least some of the network addresses for locating at least some of the media resources being stored on a common server.

48. The method of claim 37, further comprising enabling the portion of the play-list including the plurality of the media resources to be automatically and continuously played back in response to a user-action.

49. The method of claim 37, further comprising enabling media resources located by one or more media resource locators in the search result to be captured on a storage medium for subsequent playback.

50. The method of claim 37, further comprising enabling media resources in the portion of the play-list being played back to be captured on a storage medium for subsequent playback.

51. A method for playing back streaming media on a terminal coupleable to a network, the method comprising:
receiving a query from a user of the terminal;
signaling a search request based on the query to one or more network sites;
receiving a search result from the one or more network sites, the search result including a plurality of media resource locators;
signaling at least some of the plurality of media resource locators to a media player;
arranging the at least some of the plurality of media resource locators for substantially automatic and continuous play back of media resources located by the at least some the plurality of media resource locators.

52. The method of claim 51, wherein the search results each include one or more of the plurality of media resource locators arranged in an order of priority designated by a corresponding network site in the plurality of network sites, and wherein arranging the plurality of media resource locators includes at least partially arranging the plurality of media resource locators according to the priority order designated by each of the corresponding network sites.

53. The method of claim 51, wherein signaling a search request based on the query to one or more network sites includes converting the query into a uniform resource locator for locating each of the network sites on the network.

54. The method of claim 53, wherein receiving a query includes receiving a search string from a user of the terminal.

55. The method of claim 54, wherein signaling a search request based on the query includes converting the search term into a uniform resource locator for locating a corresponding network site, and arguments for submitting the search term to the network site.

56. The method of claim 51, wherein arranging the at least some of the plurality of links includes arranging a media resource located by a first media resource locator to be played back by the media player, and arranging a media resource located by a second media resource locator to be played back automatically after the media resource located by the first media resource locator is played back.

57. The method of claim 56, further comprising arranging the media resource of the first media resource locator to be played back by the media player in response to a user-input.

58. The method of claim 51, further comprising arranging the at least some of the plurality of media resource locators into a designated order based on one or more inputs received from a user.

59. The method of claim 58, further comprising displaying the plurality of media resource locators to the user in order to receive the one or more inputs.

60. The method of claim 51, further comprising displaying the plurality of media resource locators to a user, and wherein signaling at least some of the plurality of media resource locators to a media player is in response to the user selecting the at least some of the plurality of media resource locators from the displayed plurality of media resource locators.

61. A system for playing back streaming media on a terminal coupleable to a network, the system comprising:
a means for receiving a query from a user of the terminal;
a means for signaling a search request based on the query to one or more network sites;
a means for receiving one or more search results from the one or more network sites, a plurality of media resource locators being provided in the one or more search results;

a means for arranging the plurality of media resource locators into a designated order; and a means for signaling the plurality of media resource locators to the media player in the designated order so as to enable one or more of the plurality of links to be designated for a play-list that is subsequently accessible to the media player in order to automatically and continuously play back media resources that are located by media resource locators in the play-list.

62. A method for playing back streaming media from a network, the method comprising:

receiving a query from a user of the terminal;

signaling a search request based on the query to a network site;

receiving from the network site a search result containing a plurality of links, each of the plurality of links being individually selectable to open a media file; and causing multiple links in the search result to be designatable for a play-list that is subsequently accessible to a media player in order to enable substantially automatic and sequential play back of the media files by the media player individually selecting the multiple links for opening those media files.

63. The method of claim 62, wherein causing multiple links in the search result to be designatable for a play-list includes displaying the plurality of links to a user so as to enable the user to designate the one or more links for the play-list.

\* \* \* \* \*